United States Patent
Book et al.

(10) Patent No.: US 6,366,655 B1
(45) Date of Patent: Apr. 2, 2002

(54) METHOD AND SYSTEM FOR SERVICE CONTROL POINT BILLING

(75) Inventors: Nancy Ann Book, Naperville; James Daniel Kovarik, Batavia, both of IL (US); Martha Lynda Marek, Harrison Township, MI (US); Thomas Joseph McBlain, Arlington Heights; Ronald Stephen Urban, Woodridge, both of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/379,237

(22) Filed: Aug. 23, 1999

(51) Int. Cl.[7] ............................................. H04M 7/00
(52) U.S. Cl. ............................ 379/114.28; 379/114.29; 379/115.01
(58) Field of Search .............................. 379/115, 114, 379/112, 126, 220, 219, 201, 229, 230, 221.08, 221.09, 221.1, 115.01, 221.12, 114.29, 114.28

(56) References Cited

U.S. PATENT DOCUMENTS

| | | | |
|---|---|---|---|
| 5,003,584 A | 3/1991 | Benyacar et al. | |
| 5,008,929 A | 4/1991 | Olsen et al. | |
| 5,103,475 A | 4/1992 | Shuen | |
| 5,511,113 A | 4/1996 | Tasaki et al. | |
| 5,517,560 A | 5/1996 | Greenspan | |
| 5,583,976 A | 12/1996 | Bullard, Jr. | |
| 5,640,319 A | 6/1997 | Beuning et al. | |
| 5,696,908 A | * 12/1997 | Muehlberger et al. | 379/144 |
| 5,712,908 A | * 1/1998 | Brinkman et al. | 379/119 |
| 5,774,533 A | 6/1998 | Patel | |
| 5,793,853 A | 8/1998 | Sbisa | |
| 5,812,533 A | 9/1998 | Cox et al. | |
| 5,991,377 A | * 11/1999 | Malik | 379/114 |
| 6,011,837 A | * 1/2000 | Malik | 379/114 |
| 6,108,409 A | * 8/2000 | Cooper et al. | 379/230 |

\* cited by examiner

Primary Examiner—Stella Woo
Assistant Examiner—Rexford Barnie
(74) Attorney, Agent, or Firm—Brinks Hofer Gilson & Lione (57) ABSTRACT

The preferred embodiments described herein include a method and system for billing for the use of a service control point ("SCP"). In one presently preferred embodiment, an SCP receives a query from a service switching point ("SSP") and accesses data in a database in response to the query. The accessed data is associated with a data owner. The SCP tracks that the SSP sent the query and that the data owner's data was accessed in response to the query. After a plurality of queries have been received and tracked, the SCP creates a billing record and sends it to a billing center. Using the billing record, the billing center can charge the SSP for the use of the SCP. These preferred embodiments provide an efficient way for charging for the usage of an SCP, especially when the SSP querying the SCP is owned by a different telecommunications company.

28 Claims, 6 Drawing Sheets

Fig. 2

| INDEX | ORIGINATING POINT CODE | DATA OWNER | COUNT |
|---|---|---|---|
| 100,000 | 2500891145c | 101 | 35 |
| 100,001 | 2500891146c | 101 | 165 |
| 100,002 | 2500891147c | 101 | 760 |
| 200,000 | 2500891145c | 102 | 543 |
| 200,001 | 2500891146c | 102 | 1,987 |
| 200,002 | 2500891147c | 102 | 358 |
| 300,000 | 2500891145c | 100 | 24,590 |
| 300,001 | 2500891146c | 100 | 38,201 |
| 300,002 | 2500891147c | 100 | 32,791 |

METHOD AND SYSTEM FOR SERVICE CONTROL POINT BILLING

TECHNICAL FIELD

The present invention relates generally to telecommunication systems and in particular to billing aspects of telecommunication systems.

BACKGROUND

Figure 6:
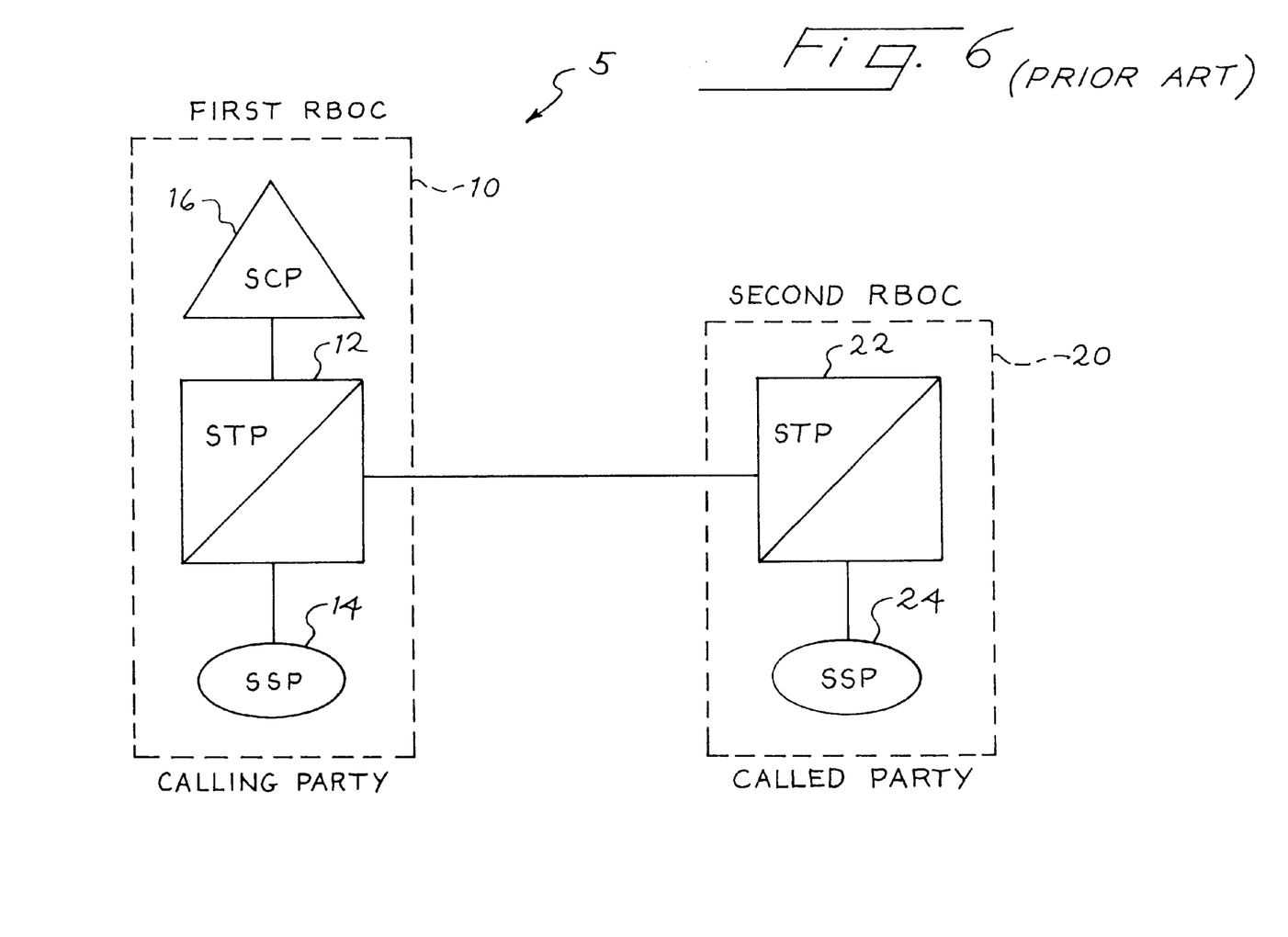
FIG. 6 is a block diagram of a prior art telecommunication system.

Many telecommunication systems comprise three basic components: a signal switching point ("SSP"), a service control point ("SCP"), and a signal transfer point ("STP"), which facilitates communication between the SSP and the SCP. In operation, in response to a detected trigger (e.g., no answer, busy, etc.), the SSP sends a query message to the SCP, and the SCP consults its database and returns a response to the SSP. FIG. 6 is an example of such a telecommunication system 5. As shown in FIG. 6, the system 5 comprises a first Regional Bell Operating Company ("RBOC") 10 and a second RBOC 20. Each RBOC 10, 20 comprises an STP 12, 22 and an SSP 14, 24. The first RBOC 10 also comprises an SCP 16.

To illustrate the operation of this system 5, consider the situation in which a calling party associated with SSP 14 calls a called party associated with SSP 24. In this example, the called party subscribes to a Caller ID service. When SSP 24 receives the call from the calling party, it sends a query to the SCP 16 to determine the name of the calling party. When the SCP 16 receives the query, it consults its database to determine the name associated with the calling party's number and returns the name to SSP 24 for display to the called party.

The collection and maintenance of data in an SCP can be costly, and conventional systems do not provide an adequate mechanism for billing for the use of the SCP. In the example above, the called party pays the second RBOC 20 a subscription fee for the Caller ID service. However, the system does not provide a mechanism for adequately charging SSP 24 for the use of the SCP 16.

There is, therefore, a need for an improved method and system for service control point billing.

DETAILED DESCRIPTION OF THE PRESENTLY PREFERRED EMBODIMENTS

By way of introduction, the preferred embodiments described below include a method and system for billing for the use of a service control point ("SCP"). In one presently preferred embodiment, an SCP receives a query from a service switching point ("SSP") and accesses data in a database in response to the query. The accessed data is associated with a data owner. The SCP tracks that the SSP sent the query and that the data owner's data was accessed in response to the query. After a plurality of queries have been received and tracked, the SCP creates a billing record and sends it to a billing center. Using the billing record, the billing center can charge the SSP for the use of the SCP. These preferred embodiments provide an efficient way for charging for the usage of an SCP, especially when the SSP querying the SCP is owned by a different telecommunications company.

Figure 1:
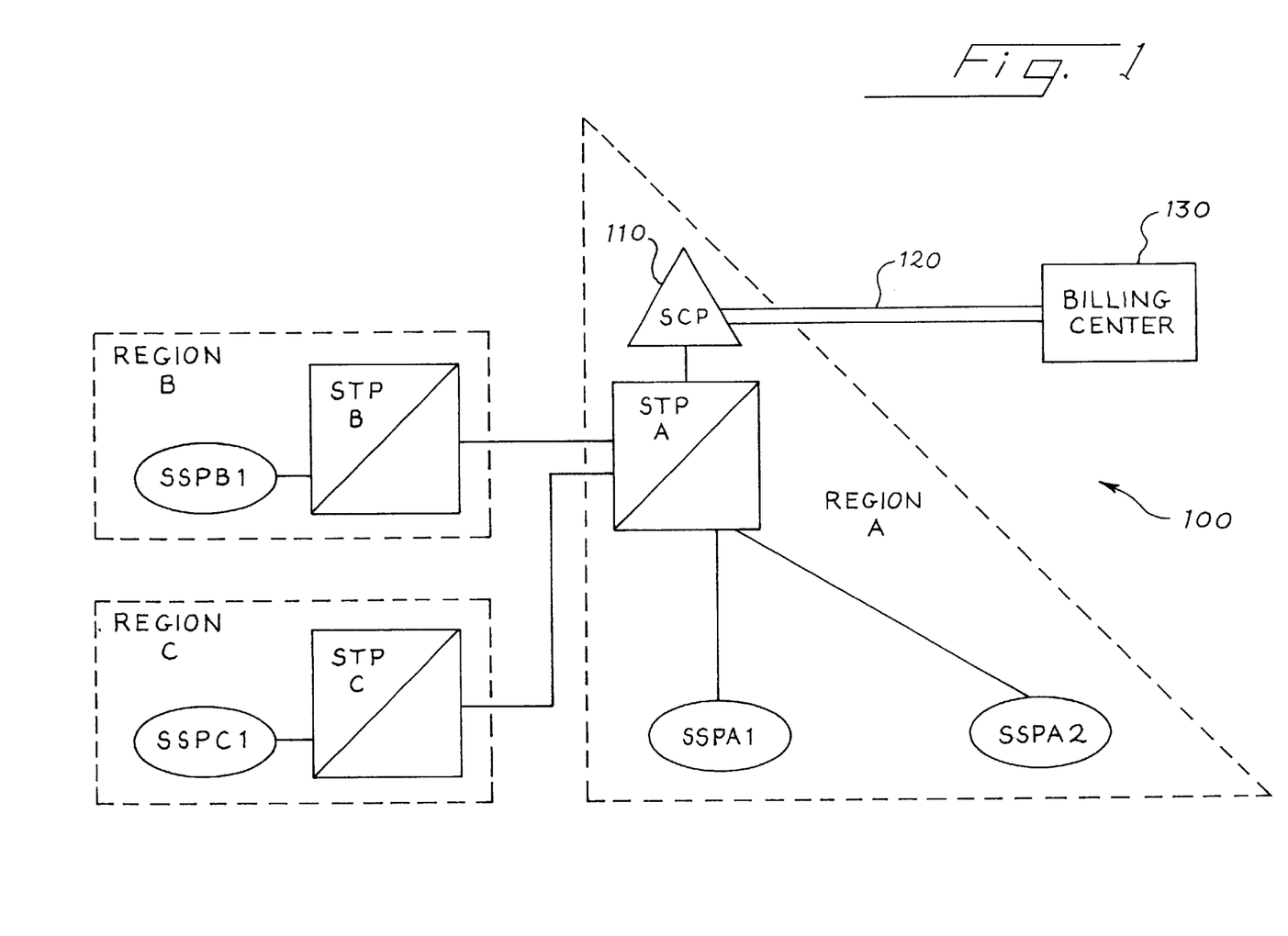
FIG. 1 is an illustration of a telecommunication system of a preferred embodiment.

Turning now to the drawings, FIG. 1 is an illustration of a telecommunication system 100. As shown in FIG. 1, this system 100 comprises three regions: Region A, Region B, and Region C. Region A comprises SSP A1 and SSP A2, a signal transfer point STP A, and an SCP 110, which is associated with a plurality of databases (not shown), each associated with a respective data owner. Regions B and C both comprise an SSP (SSP B1, SSP C1) and an STP (STP B, STP C). These components are coupled together with call processing links that transfer call processing information between the components. As used herein, the term "coupled with" means directly coupled with or indirectly coupled with through one or more components. The SCP 110 is also coupled to a billing center 130 via a communications link 120. In one preferred embodiment, the communications link 120 is free of call processing information, unlike the call processing links that couple the other components in Regions A, B, and C (i.e., unlike the links that couple the SSPs, STPs, and SCP to one another).

Figure 2:
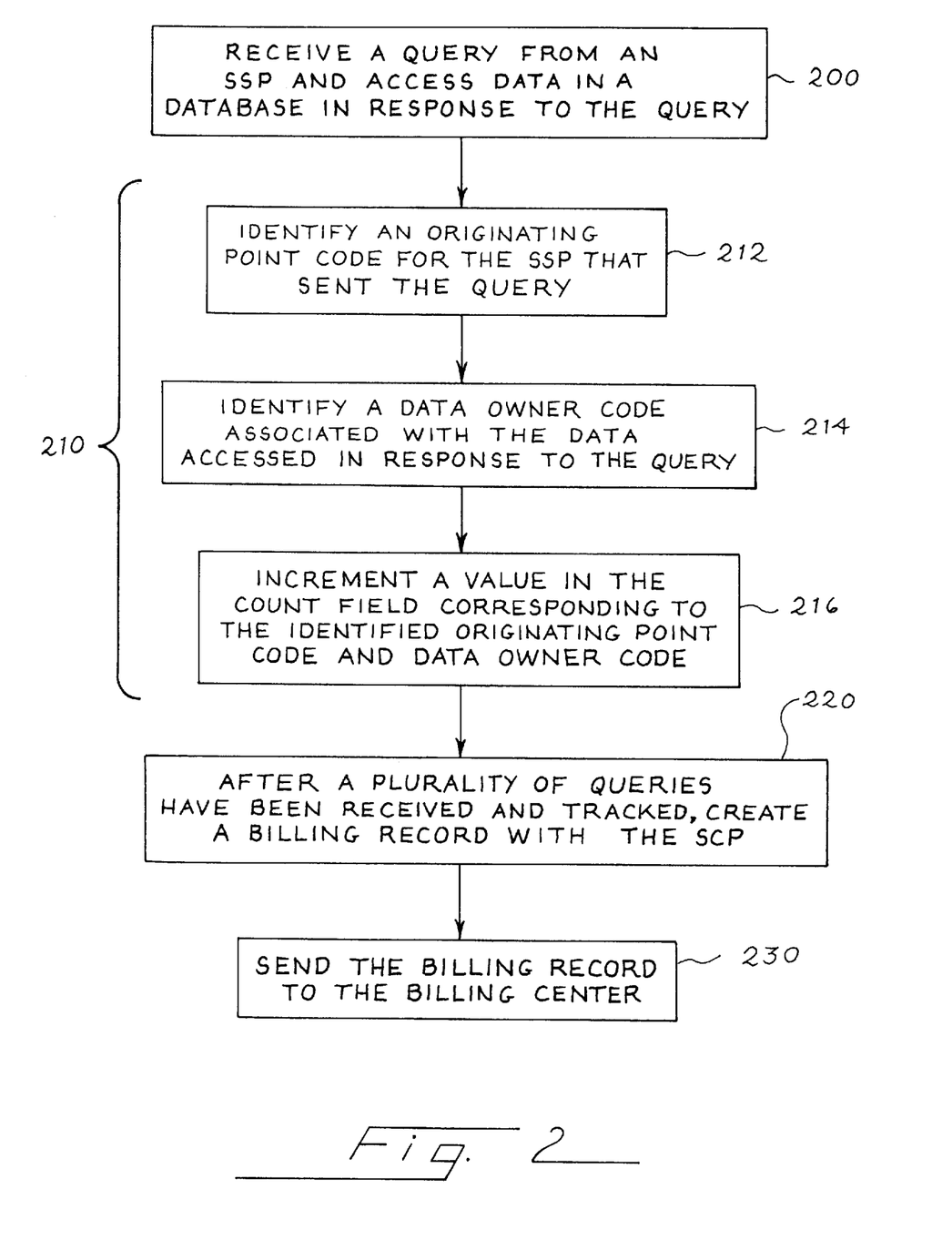
FIG. 2 is a flow chart of a method of a preferred embodiment using the telecommunication system of FIG. 1.
Figure 3:
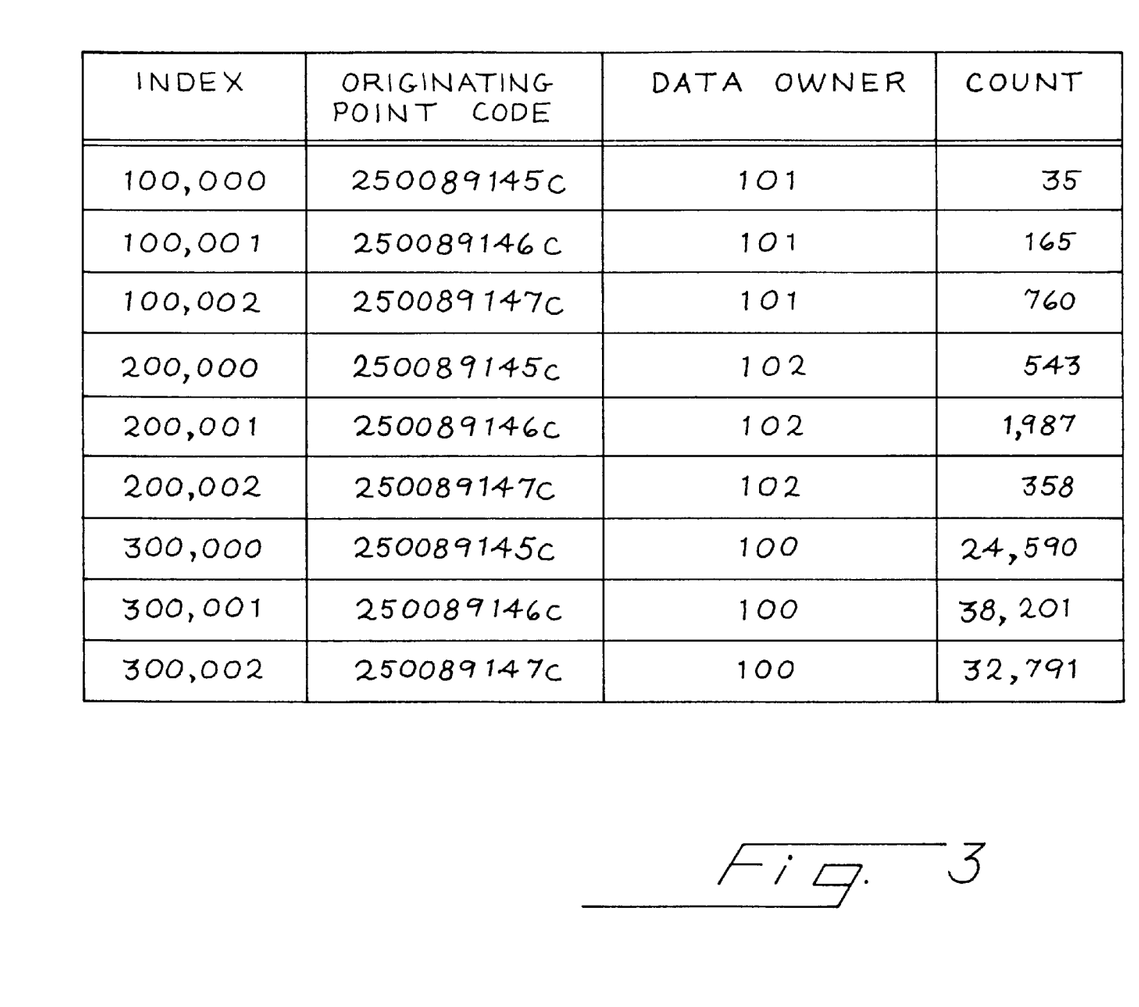
FIG. 3 is an illustration of a table of a service control point of a preferred embodiment.

A preferred method of billing for the usage of the SCP 110 is shown in the flow chart of FIG. 2. First, the SCP 110 receives a query from one of the SSPs and accesses data in one of the databases in response to the query (block 200). Next, the SCP 110 tracks which SSP sent it a query and which data owner's data was accessed in response to the query (block 210). In one preferred embodiment, the SCP 110 has a table with entries comprising originating point code, data owner code, and count fields. An example of such a table is shown in FIG. 3. To track the queries, the SCP 110 first identifies an originating point code for the SSP that sent it the query (block 212) and identifies a data owner code associated with the data accessed in response to the query (block 214). Next, the SCP 110 increments a value in the count field corresponding to the identified originating point code and data owner code (block 216). After a plurality of queries have been received and tracked, the SCP 110 creates a billing record for each entry in the table (block 220) and sends the billing record to a billing center 130 (block 230).

There are several advantages associated with this preferred embodiment. First, because the SCP 110 records which SSP sent the query, the owner of the SCP can identify and charge the SSP for usage of its resource. Additionally, because the SCP 110 records which data owner is associated with the database accessed in response to the query, the charges can be apportioned to the appropriate data owner. These advantages are especially important when an SSP in one region is querying an SCP in another region. Consider the situation in which Region A is associated with a first RBOC, Region B is associated with a second RBOC, and Region C is associated with a Local Exchange Carrier ("LEC"). With the preferred embodiment described above, use of the SCP 110 in Region A can be charged to the second RBOC or the LEC when a query is sent from Region B or C, respectively. Some conventional systems, in contrast, cannot provide for such billing since the billing record is created in network components (such as an SSP) located within the region that sent the query. Further, because the billing record created in this preferred embodiment indicates which data owner's data was accessed, charges can be apportioned among the various data owners associated with the SCP's databases.

Second, because the SCP 110 does not create and send billing records until after a plurality of queries have been received and tracked, the SCP 110 efficiently uses its data storage and processing resources. For example, if an SCP creates a billing record every time a query is sent to it, a typical SCP would create and store about 20 million billing records. In contrast, with the SCP of this preferred embodiment programmed to create a billing record once per day, only about 10,000 billing records would be created and stored. Additionally, because the billing record sent to the billing center 130 contains an indication of how many times a given SSP used a given data owner's data for the aggregated time period, the billing center 130 can quickly determine the charges due to the data owner by the SSP. In contrast, if the billing records were sent to the billing center 130 after each query, the billing center 130 would spend significant processing time sorting and apportioning each record to the appropriate SSP.

Additionally, because communication between the SCP 110 and the billing center 130 does not affect call processing, the communications link 120 between the SCP 110 and the billing center 130 can be free of call processing information. Further, the billing record created by the SCP 110 can be sent to the billing center 130 without passing through an SSP. Also, in one preferred embodiment, the billing record received by the billing center 130 includes information regarding the use of the SCP 110 and not of any usage or billing information regarding any of the SSPs in the network 100. Accordingly, in one preferred embodiment, the billing center 130 is provided with a specific billing record (via a communication link free of call processing information) that details the use of the SCP 110 and is separate from a billing record detailing the use of the SSP.

Figure 4:
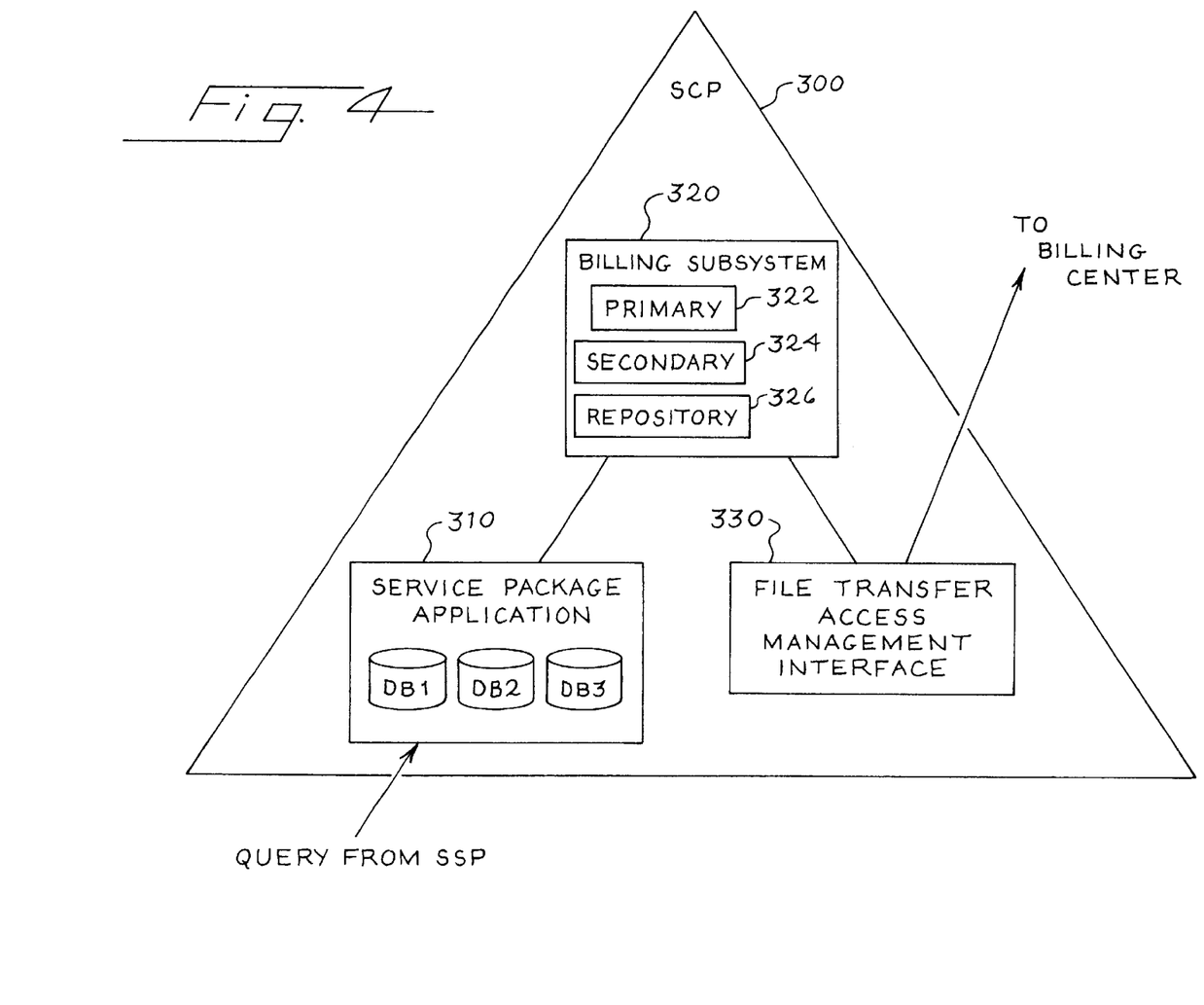
FIG. 4 is a block diagram of a service control point of a preferred embodiment.
Figure 5:
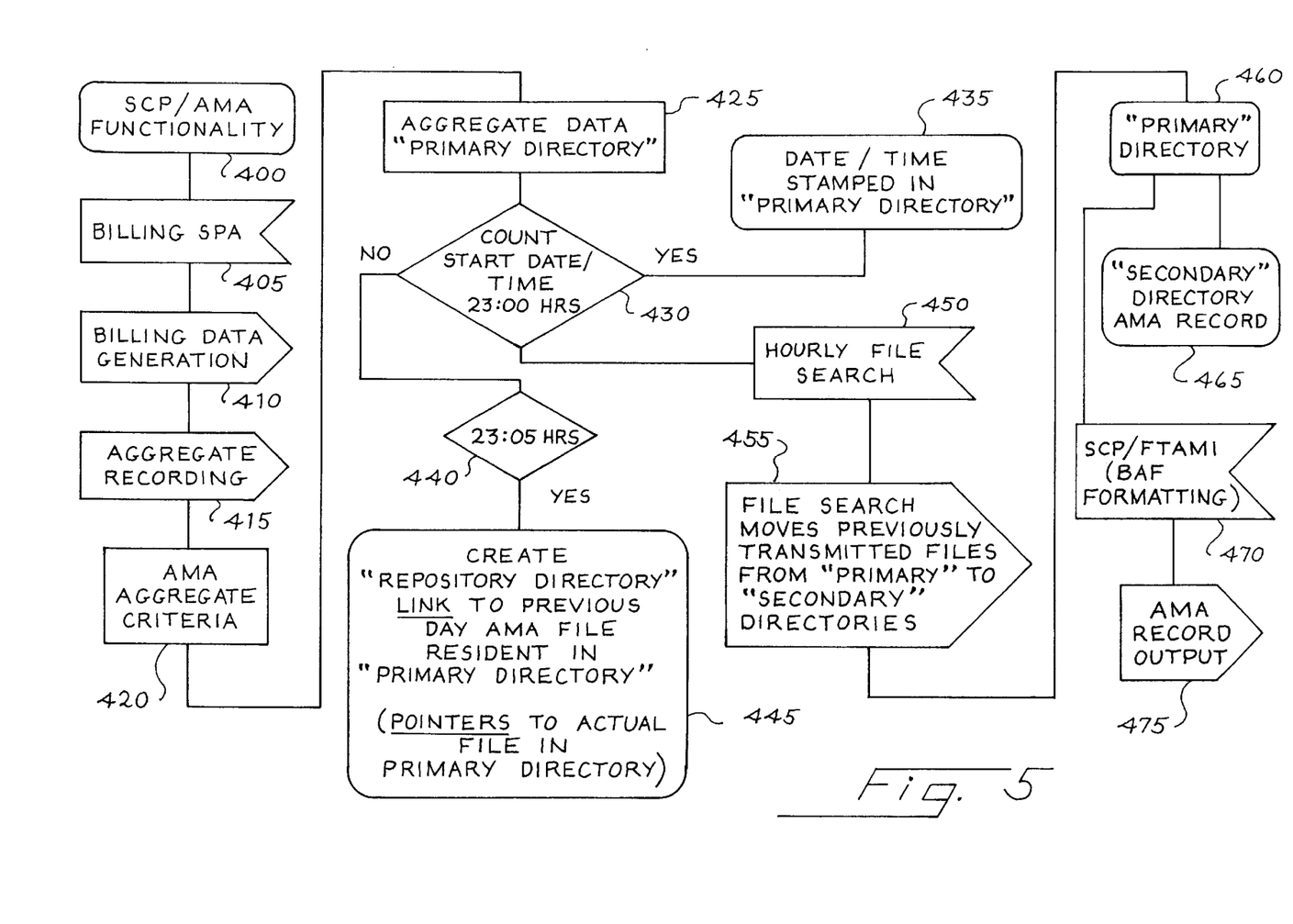
FIG. 5 is a flow chart of a method of another preferred embodiment.

Turning again to the drawings, FIG. 4 is an illustration of an SCP 300 of another presently preferred embodiment. As shown in FIG. 4, this SCP 300 comprises a service package application ("SPA") 310, a billing subsystem 320, and a file transfer access management interface ("FTAMI") 330. The SPA 310 comprises databases DB1, DB2, DB3, each associated with a respective data owner. The billing subsystem 320 comprises a primary directory 322, a secondary directory 324, and a repository directory 326. FIG. 5 is a flow chart of a preferred method of using this SCP 300. It is important to note that the method shown in FIG. 5 is merely one implementation and that other implementations can be used.

In operation, when the SPA 310 receives a query from an SSP, it responds to the query by accessing one of the plurality of databases DB1, DB2, DB3. This functionality is represented at block 400 in FIG. 5. When the logic in the SPA 310 for accessing a database is traversed, the billing logic is also traversed (block 405). In one alternate embodiment, however, the billing logic can be selectively enabled so that not every query will result in the billing logic being traversed.

Next, the SPA 310 generates billing data (block 410) by determining which SSP sent it a query and which data owner is associated with the database that was accessed to respond to the query. In one preferred embodiment, the SPA 310 finds a CLEC_ID for the calling_party_id by looking at an NPA_NPANXX_Names table. The CLEC_ID points to an Originating_CLEC_ID_Index in the CLEC fsm. The Originating_CLEC_ID_Index can be used to determine the Data Owner value for the CLEC. In this embodiment, the originating point code is used to identify the SSP that sent the query.

The SPA 310 then begins the aggregate recording process by tracking which SSP sent it the query and which data owner's database was accessed (block 415). In one preferred embodiment, the SPA 310 has an internal table with an originating point code field, a data owner field, and a count field to track how many queries have been received. Instead of using a table with enough rows for every possible point code and every data owner, it is preferred that the table be divided into blocks of 100,000 records. Each block would contain the entries for a single data owner. Within each data owner block, up to 100,000 different originating point codes can be stored. In operation, the SPA 310 increments (or inserts) a count in the appropriate row in the table.

In one embodiment, the data stored in the SPA 310 table is not formatted in accordance with the Automatic Message Accounting ("AMA") standard. In response to a billing event, the SPA 310 creates an AMA record for each entry stored in the internal table (block 420). In one preferred embodiment, the billing event automatically occurs at a predetermined time. For example, a billing event can be scheduled to automatically occur at 12:20 AM each day. In addition to or as an alternative to automatic billing events, a command sent to the SPA 310 can trigger a billing event. For example, if a command is sent to the SPA 310 on Monday at 3:00 PM, AMA records can be created for the data stored in the internal table. Then, on Tuesday at 12:20 AM, an automatic billing event causes the SPA 310 to create AMA records for the data stored in the table since 3:00 PM Monday. The SPA 310 would then schedule the next billing event for Wednesday at 12:20 AM.

After the SPA 310 creates the AMA records, the billing subsystem 320 collects the AMA records from the SPA 310 and stores them in the primary directory 322 (block 425). As will be described in detail below, the AMA records stored in the primary directory 322 are the records that will be sent to the billing center. In one embodiment, the billing subsystem 320 sends an acknowledgement to the SPA 310 after it receives the AMA records.

At a predetermined time (such as 23:00 hours) (block 430), the FTAMI 330 date/time stamps the records in the primary database 322 (block 435). At a later predetermined time (such as 23:05 hours) (block 440), the FTAMI 330 creates a link or pointer to the previous day's AMA records stored in the primary directory 322 and stores this link in the repository directory 326 (block 445). At a predetermined time or upon a request from the billing center, a file search is performed by the FTAMI 330 (block 450). The FTAMI 330 checks each AMA file in the primary directory 322 and determines which files have been previously transmitted to the billing center. The previously-transmitted files are moved from the primary directory 322 to the secondary directory 324 and a link to these files is deleted from the repository directory (block 455). Accordingly, only records that have not been previously transmitted to the billing center are now stored in the primary directory 322 (block 460), while the previously-transmitted records are stored in the secondary directory 324 (block 470).

Next, the appropriate links in the repository directory 326 are identified, and the corresponding AMA records in the primary directory 322 are formatted to comply with the requirements of the billing center (e.g., to comply with Bellcore AMA formatting ("BAF") or to set record fields for feature usage studies) (block 470). The formatted AMA record is then outputted to the billing center directly via a communications link (block 475).

It is important to note that any appropriate software and/or hardware, analog or digital, now in existence or later developed, can be used to implement the preferred embodiments described above. A computer-usable medium having computer readable program code embodied therein can be used to perform the functions described above, and the functions described above can alternatively be implemented exclusively with hardware. Additionally, the functionality associated with each element can be combined with or distributed to other elements. Also, some of the elements described above may not be needed in all embodiments.

It is preferred that the SCPs used in these embodiments be Advanced Intelligent Network ("AIN") SCPs. AIN SCPs, in contrast to fixed program SCPs, allow for a programmable, customizable SCP. With an AIN SCP, for example, one can set the desired time to create billing records for each entry of the SCP table.

It is intended that the foregoing detailed description be understood as an illustration of selected forms that the invention can take and not as a definition of the invention. It is only the following claims, including all equivalents, that are intended to define the scope of this invention.

What is claimed is:

1. A method for billing for a query to a service control point, the service control point comprising a table comprising at least one entry comprising an originating point code, a data owner code, and a count field, the method comprising the acts of
   (a) with a service control point, receiving a query from a service switching point and accessing data in a database in response to the query;
   (b) with the service control point, tracking the query in a table by:
      (b1) identifying an originating point code for the service switching point that sent the query and a data owner code associated with the data accessed in response to the query; and
      (b2) incrementing a value in a count field corresponding to the identified originating point code and data owner code;
   (c) after a plurality of queries have been received and tracked in the table, with the service control point, creating a billing record for at least some of the entries in the table; and
   (d) sending the billing records from the service control point to a billing center.

2. The method of claim 1, wherein (b) is automatically performed in response to a query.

3. The method of claim 1, wherein (b) is performed only if billing logic in the service control point has been enabled.

4. The method of claim 1, wherein (c) is performed in response to a billing event.

5. The method of claim 4, wherein the billing event automatically occurs at a predetermined time.

6. The method of claim 4, wherein the billing event automatically occurs once per day.

7. The method of claim 1, wherein (c) is performed in response to a user request.

8. The method of claim 1, wherein (d) comprises sending the billing records from the service control point to a billing center via a communications link free of call processing information.

9. The method of claim 1, wherein (d) comprises sending the billing records from the service control point to a billing center via a communications link free of service switching point billing information.

10. The method of claim 1 further comprising:
    (e) storing the billing records in a primary directory in the service control point; and
    (f) storing a link to the billing records in a repository directory in the service control point; both of said storing acts occurring before (d);
    wherein (d) comprises identifying the link in the repository directory and sending a copy of the billing records stored at the link to the billing center.

11. The method of claim 10 further comprising:
    (g) transferring the billing records from the primary directory to a secondary directory in the service control point; and
    (h) deleting the link in the repository directory.

12. A method for billing for a query to a service control point, the method comprising the acts of:
    (a) with a service control point, receiving a query from a service switching point and accessing data in a database in response to the query, the data being associated with a data owner;
    (b) with the service control point, tracking that the service switching point sent the query to the service control point and that the data owner's data was accessed in response to the query;
    (c) after a plurality of queries have been received and tracked, creating a billing record with the service control point; and
    (d) sending the billing record from the service control point to a billing center.

13. The method of claim 12, wherein the service control point comprises a table comprising at least one entry comprising an originating point code, a data owner field, and a count field; and wherein (b) comprises:
    (b1) identifying an originating point code for the service switching point that sent the query and the data owner associated with the data accessed in response to the query; and
    (b2) incrementing a value in the count field corresponding to the identified originating point code and data owner.

14. The method of claim 12, wherein (b) is automatically performed in response to a query.

15. The method of claim 12, wherein (b) is performed only if billing logic in the service control point has been enabled.

16. The method of claim 12, wherein (c) is performed in response to a billing event.

17. The method of claim 16, wherein the billing event automatically occurs at a predetermined time.

18. The method of claim 16, wherein the billing event automatically occurs once per day.

19. The method of claim 12, wherein (c) is performed in response to a user request.

20. The method of claim 12, wherein (d) comprises sending the billing record from the service control point to a billing center via a communications link free of call processing information.

21. The method of claim 12, wherein (d) comprises sending the billing record from the service control point to a billing center via a communications link free of service switching point billing information.

22. The method of claim 12 further comprising:
    (e) storing the billing record in a primary directory in the service control point; and (f) storing a link to the billing record in a repository directory in the service control point; both of said storing acts occurring before (d);

wherein (d) comprises identifying the link in the repository directory and sending a copy of the billing record stored at the link to the billing center.

23. The method of claim 22 further comprising:

(g) transferring the billing record from the primary directory to a secondary directory in the service control point; and (h) deleting the link in the repository directory.

24. A service control point comprising:

at least one database, each database being associated with a respective data owner code;

a service package application coupled with the at least one database, the service package application operative to receive a query from a service switching point and access the at least one database in response to the query; the service package application being further operative to track that the service switching point sent the query to the service control point and that the data owner's data was accessed in response to the query;

wherein after a plurality of queries have been received and tracked, the service package application creates a billing record and sends the billing record to a billing center coupled with the service control point.

25. The invention of claim 24, wherein the service package application comprises a table comprising at least one entry comprising an originating point code, a data owner code, and a count field; and wherein the service package application is further operative to track a received query in the table by identifying an originating point code for the service switching point that sent the query and a data owner code associated with the data accessed in response to the query and by incrementing a value in the count field corresponding to the identified originating point code and data owner code.

26. The invention of claim 24, wherein the service package application is further operative to send the billing record to the billing center via a communications link free of call processing information.

27. The invention of claim 24, wherein the service package application is further operative to send the billing record to the billing center via a communications link free of service switching point billing information.

28. The invention of claim 24, wherein the service control point is an Advanced Intelligent Network service control point.

* * * * *